(12) United States Patent
de Lange et al.

(10) Patent No.: US 6,645,900 B2
(45) Date of Patent: Nov. 11, 2003

(54) OPTIMIZED METHOD FOR THE PRODUCTION OF CATALYST SUPPORTS BASED ON SILICA GEL AND CHROMIUM CATALYSTS SUPPORTED ON SILICA GEL

(75) Inventors: Paulus de Lange, Wesseling (DE); Guido Funk, Worms (DE); Andreas Deckers, Flomborn (DE); Peter Kölle, Bad Dürkheim (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 10/087,012

(22) Filed: Feb. 28, 2002

(65) Prior Publication Data

US 2002/0132941 A1 Sep. 19, 2002

Related U.S. Application Data

(63) Continuation of application No. PCT/EP00/08636, filed on Sep. 5, 2000.

(30) Foreign Application Priority Data

Sep. 9, 1999 (DE) .......................................... 199 43 166

(51) Int. Cl.⁷ .............................................. B01J 29/035
(52) U.S. Cl. ...................... 502/87; 502/257; 502/256; 502/228; 526/106; 526/130; 526/348
(58) Field of Search ................................ 502/237, 256, 502/228, 87; 526/106, 130, 348

(56) References Cited

U.S. PATENT DOCUMENTS

| 3,872,217 A | 3/1975 | Merz et al. ................. 423/338 |
| 4,845,176 A | 7/1989 | Konrad et al. .............. 526/105 |
| 5,455,216 A | * 10/1995 | Mueller et al. ............. 502/256 |
| 5,625,013 A | 4/1997 | Mueller et al. ............. 526/106 |

FOREIGN PATENT DOCUMENTS

| DE | 2540279 | 3/1977 |
| DE | 3640802 | 6/1988 |
| DE | 3640803 | 6/1988 |
| DE | 4231749 | 3/1994 |
| EP | 0263525 | 4/1988 |
| GB | 1 550 951 | * 8/1979 |

* cited by examiner

Primary Examiner—Ling-Siu Choi
(74) Attorney, Agent, or Firm—Connolly Bove Lodge & Hutz LLP

(57) ABSTRACT

The invention relates to a catalyst support and to a method for the production of the catalyst support comprising the following steps:

a) production of a silicic acid hydrogel having a solids content of from 10 to 25% by weight (calculated as $SiO_2$) whose particles are substantially spherical, b) extraction of the hydrogel particles with an alcohol until at least 60% of the water present in the hydrogel has been removed, c) drying of the resultant hydrogel until the residual alcohol content is less than 10% by weight (xerogel formation) at temperatures of $\geq 160°$ C. at atmospheric pressure using an inert entraining gas, d) setting of the desired particle size of the resultant xerogel, in which the hydrogel particles have a particle size of $\geq 8$ mm before the extraction, and to a catalyst and to a method for the production of the catalyst by loading the catalyst support with a chromium compound. The invention also relates to a method for the production of polyolefins using the catalyst.

12 Claims, No Drawings

OPTIMIZED METHOD FOR THE PRODUCTION OF CATALYST SUPPORTS BASED ON SILICA GEL AND CHROMIUM CATALYSTS SUPPORTED ON SILICA GEL

This application is a continuation of PCT/EP00/08636 filed Sep. 5, 2000 which published as International Application WO 01/18069 which in turn claims benefit of priority to German Application No. 199 43 166.3 filed Sep. 9, 1999.

The invention relates to a method for the production of silica gel catalyst supports and chromium oxide catalysts supported on silica gel, and to the corresponding catalyst supports and catalysts for the polymerization of olefin monomers.

Polymerization catalysts which comprise silica gel or modified silica gel as support material and chromium as active component play an essential role in the production of high density polyethylene (HDPE). The conditions during production of the supports and the catalysts determine the chemical composition, pore structure, particle size and shape of the catalysts. Before the polymerization, the catalysts are activated at high temperatures in order to stabilize chromium on the catalyst surface as Cr(VI) species. This species is reduced by addition of ethene or additional reducing agents in order to form the catalytically active species which catalyses the polymerization. The composition of the catalyst support and of the catalyst, its structure and the activation conditions have a crucial influence on the performance of the catalyst in the polymerization method, the activity of the catalyst, the structure and the properties of the resultant polymer.

DE-A 25 40 279 relates to a method for the production of a catalyst for the polymerization of unsaturated compounds which is suitable for the production of readily processable olefin polymers of low melt viscosity without the use of large amounts of hydrogen as molecular weight regulator. In this method, firstly a fine particle silicic acid xerogel is prepared starting from a silicic acid hydrogel having a solids content of from 10 to 25% by weight (calculated as $SiO_2$), extraction of the water from the hydrogel, drying (xerogel formation), grinding and sieving of the xerogel. The xerogel is subsequently loaded with chromium oxide or a chromium compound which converts into chromium oxide, and activated. The starting material here is a spherical silicic acid hydrogel which has a particle diameter of from 1 to 8 mm.

EP-A 0 263 525, DE-A 36 40 802 and DE-A 36 40 803 relate to refinements of the method disclosed in DE-A 25 40 279 for the production of a catalyst for the polymerization of unsaturated compounds.

Thus, EP-A 0 263 525 describes a method for the production of polyethylene and copolymers of ethene using the catalyst prepared in accordance with DE-A 25 40 279 and an alkyllithium as cocatalyst. The alkyllithium here serves to increase the productivity of the catalyst, to reduce the induction time of the polymerization and the sensitivity of the catalyst to impurities, and to provide polymers having favourable morphological properties.

DE-A 36 40 802 relates to a method for the production of grit-form ethene homo-polymers and ethene copolymers in which a catalyst which has a narrow particle size distribution, enabling the production of polymers having a controllable, optimum particle morphology, is prepared on the basis of the method of DE-A 25 40 279. In accordance with DE-A 36 40 803, this catalyst is employed together with an alkyllithium as cocatalyst.

Of crucial importance for the pore volume of the catalyst support prepared by the method disclosed in DE-A 25 40 279 is the extraction of the water from the hydrogel employed. This is carried out using an organic solvent and generally takes about 12 hours. The extraction is thus the capacity-determining step in the method according to DE-A 25 40 279.

The object of the present invention is a refinement of the method according to DE-A 25 40 279 for the production of a catalyst support based on silica gel and of a chromium oxide catalyst supported on silica gel. The aim here is, in particular, for the method to be carried out more efficiently in terms of time than the known methods through a shortening of the extraction time, with the catalyst retaining its excellent properties.

This object is achieved by a method for the production of a catalyst support comprising the following steps:
 a) production of a silicic acid hydrogel having a solids content of from 10 to 25% by weight (calculated as $SiO_2$) whose particles are substantially spherical, by
  a1) introduction of a sodium water-glass or potassium water-glass solution into a swirling stream of a mineral acid, both longitudinally and tangentially to the stream,
  a2) spraying of the resultant silicic acid hydrosol in drop form into a gaseous medium,
  a3) allowing the hydrosol to solidify in the gaseous medium to give hydrogel particles,
  a4) washing of the resultant substantially spherical hydrogel particles in order to free the hydrogel from salts,
 b) extraction of the hydrogel particles with an alcohol until at least 60% of the water present in the hydrogel has been removed,
 c) drying of the resultant hydrogel until the residual alcohol content is less than 10% by weight (xerogel formation) at temperatures of $\geq 160°$ C. at atmospheric pressure using an inert entraining gas,
 d) setting of the desired particle size of the resultant xerogel.

The method according to the invention is characterized in that the hydrogel particles have a particle size of $\geq 8$ mm before the extraction.

The extraction of the water with an alcohol takes place significantly more quickly if the hydrogel particles have a diameter of $\geq 8$ mm, preferably in the range from 10 to 15 mm, particularly preferably from 10 to 12 mm. At the same time, an alcohol consumption which is reduced by about 20% compared with known methods is observed as a secondary effect. The economic efficiency of the method is thus increased.

The extraction is generally carried out in a period of from 1 to 10 hours, preferably from 4 to 8 hours, particularly preferably from 2 to 6 hours. The total duration of the production method can thus be considerably shortened compared with known methods.

Step a)

The characteristic feature of step a) of the method according to the invention is the use of a substantially spherical silicic acid hydrogel having a relatively high solids content in the range from 10 to 25% by weight, preferably from 12 to 20% by weight, particularly preferably from 14 to 20% by weight (calculated as $SiO_2$). The production method for this silicic acid hydrogel is carried out by steps a1) to a4), which are described in detail in DE-A 25 40 279 and the literature cited therein.

After introduction of a sodium water-glass or potassium water-glass solution into a swirling stream of a mineral acid, for example sulphuric acid, step a1), the resultant silicic acid hydrosol is sprayed into a gaseous medium by means of a nozzle, step a2). The nozzle orifice employed here results, after the hydrosol has been allowed to solidify in the gaseous medium, step a3), in hydrogel particles having a particle size distribution in which in general from 90 to 99% by weight, preferably from 95 to 98% by weight, of the particles have a particle diameter in the range from 8 to 15 mm. After the hydrogel particles have been washed, step a4), preferably with warm, weakly ammoniacal water at about 50° C., in a continuous countercurrent method, the spherical particles are sieved. Hydrogel particles having a diameter of ≧8 mm, preferably in the range from 10 to 15 mm, particularly preferably from 10 to 12 mm, are isolated and transferred into an extraction vessel.

Step b)

The extraction of the water from the silicic acid hydrogel by means of an alcohol can be carried out in conventional extraction apparatuses, for example a column extractor in co- or countercurrent.

Suitable alcohols are preferably $C_1$- to $C_4$-alcohols, such as tert-butanol, i-propanol, ethanol and methanol. Use can also be made here of a mixture of different alcohols. Methanol is very particularly preferably employed. The alcohol employed should comprise less than 5% by weight, preferably less than 3% by weight, of water before the extraction.

In a preferred embodiment, the silicic acid hydrogel particles are transferred into an extraction vessel for extraction of the water, and sufficient alcohol is added until the hydrogel particles are covered with the alcohol. The alcohol is subsequently allowed to run out, and fresh alcohol is introduced. This operation is repeated until at least 60% of the water present in the hydrogel has been removed.

Step c) and Step d)

The hydrogel obtained after the extraction is dried in a conventional drying apparatus, in general at temperatures of ≧160° C., preferably in the range from 165 to 190° C., particularly preferably at about 180° C., and a pressure in the range from 600 to 1060 mbar, preferably from 900 to 1060 mbar, particularly preferably at about atmospheric pressure, using an inert entraining gas, preferably nitrogen. The drying is continued until the weight loss, measured by thermogravimetry, at 160° C. is <10% by weight, preferably <5% by weight (xerogel formation).

The desired particle size of the xerogel is subsequently set, for example by grinding in a pin mill or impact disc mill followed by sieving, to a diameter in the range from 1 to 700 $\mu$m, preferably from 1 to 250 $\mu$m.

The xerogel particles prepared by the method according to the invention serve as catalyst supports for chromium oxide catalysts for the polymerization of unsaturated compounds. The present invention thus furthermore relates to catalyst supports prepared by the method according to the invention.

The chromium oxide catalysts are preferably prepared by loading the catalyst support according to the invention with a chromium compound by e) loading the xerogel obtained in accordance with the invention with the desired amount of chromium by means of a 0.05 to 15% by weight solution of a chromium compound which converts into a chromium (VI) compound under the reaction conditions of step f) in an alcohol comprising a maximum of 20% by weight of water, by evaporation of the alcohol, and f) heating the resultant product to temperatures in the range from 300 to 1100° C. for a period of from 10 to 1000 minutes in an anhydrous gas stream comprising at least 10% by volume of oxygen.

Step e) and step f) are carried out here as described in DE-A 25 40 279.

Step e)

The alcohol employed in step e) is preferably a $C_1$- to $C_4$-alcohol, particularly preferably methanol. Suitable chromium compounds are, for example, chromium trioxide and soluble salts of trivalent chromium with an organic or inorganic acid, such as acetate, oxalate, sulphate or nitrate. Particular preference is given to the use of salts of acids which, on activation, are converted without leaving a residue into chromium(VI), such as chromium(III) nitrate nonahydrate.

The xerogel is mixed with the alcohol, for example in a double-cone mixer, and the alcohol and, if desired, water are distilled off at temperatures in the range from 20 to 150° C., preferably from 130 to 150° C., and pressures in the range from 10 mbar to 1 bar, preferably from 300 to 900 mbar.

Step f)

The activation of the catalyst (step f)) is preferably carried out at temperatures in the range from 300 to 1100° C., particularly preferably from 500 to 800° C., over a period of preferably from 60 to 1000 minutes, particularly preferably from 200 to 800 minutes, for example in a fluidized bed through which a stream of air flows.

By means of the method according to the invention, a catalyst is obtainable having a chromium content in the range from 0.1 to 2% by weight, preferably from 0.7 to 1.5% by weight, particularly preferably from 0.9% by weight to 1.2% by weight, based on the total weight of the catalyst. This catalyst is suitable for the homo- and copolymerization of unsaturated compounds. The unsaturated compounds employed are preferably ethene or $C_3$- to $C_8$-$\alpha$-monoolefins.

The present invention therefore furthermore relates to a method for the production of polyolefins using the chromium oxide catalyst according to the invention. The polymerization can be carried out in a conventional manner, with polymerization in suspension or in the gas phase being preferred.

The following examples additionally explain the invention.

EXAMPLE 1 (ACCORDING TO THE INVENTION)

Production of the Support Material (Xerogel)

A mixing nozzle depicted in the figure of U.S. Pat. No. 3,872,217 having the following data was used: the diameter of the cylindrical mixing chambers formed from a plastic tube was 14 mm, the mixing chamber length (including post-mixing zone) was 350 mm. A tangential feed hole with a diameter of 4 mm for the mineral acid was installed close to the mixing chamber entry side, which is closed on the front face. This was followed by four further holes, likewise having a diameter of 4 mm and the same feed direction for the water-glass solution, with the separation of the holes from one another, measured in the longitudinal direction of the mixing chamber, being 30 mm. Accordingly, the length: diameter ratio for the primary mixing zone was approximately equal to 10:1. For the subsequent secondary mixing zone, this ratio was about 15:1. As spray orifice, a piece of pipe of defined diameter was pushed over the exit end of the plastic tube.

This mixing apparatus was charged with 325 l/h of 33% by weight sulphuric acid at 20° C. with an operating pressure of about 3 bar and 1100 l/h of water-glass solution (prepared from technical-grade water glass containing 27% by weight of $SiO_2$ and 8% by weight of $Na_2O$ by dilution with water) having a weight per liter of 1.20 kg/l and a temperature of likewise 20° C. with a pressure of likewise about 3 bar. In the mixing chamber lined with the plastic tube, progressing neutralization caused the formation of an unstable hydrosol having a pH of between 7 and 8, which remained in the post-mixing zone for a further approximately 0.1 second until complete homogenization, before being sprayed into the atmosphere as a sheet-like jet of liquid through the nozzle orifice. During flight through the air, the jet split into individual drops, which, as a consequence of surface tension, converted into a substantially spherical shape and solidified within about one second, even during their flight, to give hydrogel beads. The diameter of the nozzle orifice was set in such a way that beads having the following particle size distribution were obtained:

| | |
|---|---|
| <8 mm | 0.8% by weight |
| 8–10 mm | 32.7% by weight |
| 10–12 mm | 38.2% by weight |
| 12–15 mm | 26.6% by weight |
| >15 mm | 1.7% by weight |

The beads had a smooth surface, were clear and comprised 17% by weight of $SiO_2$.

The beads which had a diameter in the range from 10 to 15 mm were isolated by sieving, and 420 kg of these beads were introduced into an extraction vessel. Methanol was allowed to run in until the beads were covered with liquid. The liquid was then allowed to run out, and methanol was again introduced. This method was repeated until the density of the methanol/water mixture running out was ≦0.805 g/ml (at 20° C.). The extraction duration was 5 hours, and 1960 l of methanol were consumed.

The resultant material was dried at 180° C. and atmospheric pressure using nitrogen at 200° C. as entraining gas until the weight loss, determined by thermogravimetry, at 160° C. was less than 10%.

The dried xerogel was subsequently ground using a pin mill, and the xerogel support particles which had a diameter of from 1 to 250 μm were isolated by sieving.

Production of the Catalyst 10 kg of the xerogel support described were introduced into a double-cone mixer together with 17 l of a 5.4% by weight solution of chromium(III) nitrate nonahydrate with methanol. The methanol was then distilled off under reduced pressure with rotation of the mixer, which was externally heated to 130° C. by means of steam.

The catalyst obtained in this way had an analytically determined content of 1% by weight of Cr.

EXAMPLE 2 (COMPARATIVE EXAMPLE)

The support is prepared as in Example 1. By changing the diameter of the nozzle orifice, hydrogel beads having the following particle size distribution were obtained:

| | |
|---|---|
| >8 mm | 10% by weight |
| 6–8 mm | 45% by weight |
| 4–6 mm | 34% by weight |
| <4 mm | 11% by weight |

The beads which had a diameter in the range from 2 to 6 mm were isolated by sieving, and 420 kg of these beads were introduced into an extraction vessel. Methanol was allowed to run in until the beads were covered with liquid. The liquid was then allowed to run out, and methanol was again introduced. This method was repeated until the density of the methanol/water mixture running out was ≦0.805 g/ml (at 20° C.). The extraction duration was 12 hours, and 2700 l of methanol were consumed.

What is claimed is:

1. A method for the production of a catalyst support comprising the following steps:

a) production of a silicic acid hydrogel having a solids content of from 10 to 25% by weight (calculated as $SiO_2$) whose particles are substantially spherical, by
  a1) introducing a sodium water-glass or potassium water-glass solution into a swirling stream of a mineral acid, both longitudinally and tangentially to the stream to give the silicic acid hydrosol,
  a2) spraying of the resultant hydrosol in drop form into a gaseous medium,
  a3) allowing the hydrosol to solidify in the gaseous medium to give substantially spherical hydrogel particles,
  a4) washing of the resultant hydrogel particles in order to free the hydrogel from salts, b) extraction of the hydrogel particles with an alcohol until at least 60% of the water present in the hydrogel has been removed, c) drying of the resultant hydrogel until the residual alcohol content than 10% by weight (xerogel formation) at temperatures of 160° C. at atmospheric pressure using an inert entraining gas, d) setting of the desired particle size of the resultant xerogel, and wherein at least 90 to 99% by weight of said particles have a particle size 8 mm before the extraction.

2. The method according to claim 1, wherein the hydrogel particles have a particle size in the range from 10 to 15 mm.

3. The method according to claim 1, wherein the extraction duration in step b) is from 4 to 8 hours.

4. The method according to claim 2, wherein the extraction duration in step b) is from 4 to 8 hours.

5. The method according to claim 1 wherein a $C_{1-4}$ alcohol is employed as extractant.

6. The method according to claim 4, wherein a $C_{1-4}$ alcohol is employed as extractant.

7. The method according to claim 5, wherein said alcohol is methanol.

8. The method according to claim 6, wherein said alcohol is methanol.

9. A catalyst support which is prepared by the method according to claim 1.

10. A method for the production of a catalyst support comprising the following steps:

a) production of a silicic acid hydrogel having a solids content of from 10 to 25% by weight (calculated as $SiO_2$) whose particles are substantially spherical, by
  a1) introducing a sodium water-glass or potassium water-glass solution into a swirling stream of a mineral acid, both longitudinally and tangentially to the stream to give the silicic acid hydrosol,
  a2) spraying of the resultant hydrosol in drop form into a gaseous medium,
  a3) allowing the hydrosol to solidify in the gaseous medium to give substantially spherical hydrogel particles,
  a4) washing of the resultant hydrogel particles in order to free the hydrogel from salts, b) extraction of the hydrogel particles with an alcohol until at least 60% of the water present in the hydrogel has been removed, c) drying of the resultant hydrogel until the residual alcohol content is less than 10% by weight (xerogel formation) at temperatures of 160° C. at atmospheric pressure using an inert entraining gas, d) setting of the desired particle size the resultant xerogel, and wherein 90 to 99% by weight of said particles 10 mm have a particle size before the extraction.

11. The method as claimed in claim 1, wherein 90 to 99% by weight of said particles have a particle diameter in the range from 8 to 15 mm.

12. A catalyst support which is prepared by the method according to claim 10.

* * * * *

UNITED STATES PATENT AND TRADEMARK OFFICE
CERTIFICATE OF CORRECTION

PATENT NO.   : 6,645,900 B2
DATED        : November 11, 2003
INVENTOR(S)  : Paulus D. Lange et al.

It is certified that error appears in the above-identified patent and that said Letters Patent is hereby corrected as shown below:

Column 6,
Line 28, "160º C" should read -- $\geq$ 160º C --.
Line 32, "8 mm" should read -- $\geq$ 8 mm --.

Column 7,
Line 6, "160º C" should read -- $\geq$ 160º C --.

Column 8,
Line 1, "10 mm" should read -- $\geq$ 10 mm --.

Signed and Sealed this

Thirtieth Day of December, 2003

JAMES E. ROGAN
*Director of the United States Patent and Trademark Office*